(12) United States Patent
Omori et al.

(10) Patent No.: US 9,945,748 B2
(45) Date of Patent: Apr. 17, 2018

(54) PRESSURE SENSOR AND APPARATUS

(71) Applicant: MINEBEA MITSUMI Inc., Kitasaku-gun, Nagano (JP)

(72) Inventors: Kiyoshi Omori, Machida (JP); Hiroyuki Omae, Kawasaki (JP); Akira Muto, Fujisawa (JP); Tomoaki Watanuki, Fujisawa (JP)

(73) Assignee: MINEBEA MITSUMI INC., Nagano (JP)

( * ) Notice: Subject to any disclaimer, the term of this patent is extended or adjusted under 35 U.S.C. 154(b) by 0 days.

(21) Appl. No.: 15/426,388

(22) Filed: Feb. 7, 2017

(65) Prior Publication Data

US 2017/0227413 A1 Aug. 10, 2017

(30) Foreign Application Priority Data

Feb. 10, 2016 (JP) ................................ 2016-023316
Feb. 10, 2016 (JP) ................................ 2016-023317

(51) Int. Cl.
*G01L 19/14* (2006.01)

(52) U.S. Cl.
CPC .......... *G01L 19/142* (2013.01); *G01L 19/147* (2013.01)

(58) Field of Classification Search
USPC ......................................................... 73/756
See application file for complete search history.

(56) References Cited

U.S. PATENT DOCUMENTS

| 5,144,843 | A | * | 9/1992 | Tamura | G01L 9/0042 338/4 |
| 5,325,720 | A | * | 7/1994 | Zuckerwar | G01L 23/12 29/454 |
| 5,406,852 | A | * | 4/1995 | Hiraka | G01L 1/20 338/114 |
| 7,426,869 | B2 | | 9/2008 | Fujimoto | |
| 7,707,892 | B2 | | 5/2010 | Fujimoto | |
| 9,625,342 | B2 | * | 4/2017 | Nguyen | G01L 19/145 |
| 2003/0104712 | A1 | | 6/2003 | Kanesashi | |
| 2008/0141779 | A1 | * | 6/2008 | Adam | G01L 19/0007 73/715 |
| 2009/0241661 | A1 | * | 10/2009 | Dietmeier | G01L 19/14 73/323 |
| 2011/0296925 | A1 | * | 12/2011 | Miesel | G01L 9/0072 73/718 |

(Continued)

FOREIGN PATENT DOCUMENTS

| JP | 2007-315792 A | | 12/2007 |
| KR | 100901592 B1 | * | 6/2009 |

OTHER PUBLICATIONS

Jul. 10, 2017 Extended Search Report issued in European Patent Application No. 17155611.1.

*Primary Examiner* — Harshad R Patel
*Assistant Examiner* — Jamel Williams
(74) *Attorney, Agent, or Firm* — Oliff PLC (57) ABSTRACT

A pressure sensor includes a sensor member including a sensor face to which pressure is imparted and a cover member that covers at least part of the peripheral face of the sensor member while exposing the sensor face out of one end side. With such a configuration, the sensor member can be protected from a lateral force (side pressure), whereby the sensor member can be prevented from being broken by the application of the side pressure to the sensor member.

9 Claims, 6 Drawing Sheets

(56) References Cited

U.S. PATENT DOCUMENTS

| | | | | |
|---|---|---|---|---|
| 2013/0283933 A1* | 10/2013 | Liu | ............... | B24B 49/10 |
| | | | | 73/862.621 |
| 2013/0305832 A1* | 11/2013 | Wakeman | ............... | G01L 19/10 |
| | | | | 73/744 |
| 2014/0076057 A1* | 3/2014 | Slakhorst | ............... | G01L 19/145 |
| | | | | 73/715 |
| 2014/0076059 A1* | 3/2014 | Hop | ............... | G01L 19/04 |
| | | | | 73/756 |
| 2015/0047439 A1* | 2/2015 | Ogawa | ............... | G01L 1/2206 |
| | | | | 73/862.621 |
| 2015/0082894 A1* | 3/2015 | Okamoto | ............... | G01L 9/16 |
| | | | | 73/723 |
| 2016/0061682 A1* | 3/2016 | Ramsay | ............... | G01L 19/0069 |
| | | | | 73/706 |
| 2017/0089787 A1* | 3/2017 | Willcox | ............... | G01L 9/0047 |

* cited by examiner

PRESSURE SENSOR AND APPARATUS

CROSS-REFERENCE TO RELATED APPLICATION(S)

The present application claims priority to and incorporates by reference the entire contents of Japanese Patent Application No. 2016-023316 filed in Japan on Feb. 10, 2016 and Japanese Patent Application No. 2016-023317 filed in Japan on Feb. 10, 2016.

BACKGROUND OF THE INVENTION

1. Field of the Invention

The present invention relates to a pressure sensor and an apparatus including the pressure sensor.

2. Description of the Related Art

In pump apparatuses used in the medical field, infusion tubes that deliver infusion solutions such as chemical solutions and dialysates must be controlled so as not to be clogged during solution delivery operation. For this purpose, some pump apparatuses detect clogging of an infusion tube using a pressure sensor. In a pump apparatus including such a pressure sensor, maintenance work is required to be performed that dismounts the pressure sensor from the pump apparatus and cleans the pressure sensor in order to enable clogging of the infusion tube to be detected continuously with high precision. Given this backdrop, a structure of the pressure sensor mountable and dismountable on and from the apparatus is developed (refer to Japanese Laid-open Patent Publication No. 2007-315792).

However, in the conventional structure of the pressure sensor, when the pressure sensor, which has been further downsized, is mounted or dismounted, an operator pinches a base of the pressure sensor with fingers or the like to apply pressure from side (side pressure) to the base of the pressure sensor, which may break the base of the pressure sensor. This problem may occur more conspicuously when the size of a mounting width for the pressure sensor is smaller than the size of the pressure sensor. Given these circumstances, a pressure sensor that can prevent the base from being broken by the application of side pressure to the base even for a more downsized pressure sensor has been demanded.

The present invention has been made in view of the above problem, and an object thereof is to provide a pressure sensor and an apparatus that can prevent a base of the pressure sensor from being broken by the application of side pressure to the base of the pressure sensor.

SUMMARY OF THE INVENTION

It is an object of the present invention to at least partially solve the problems in the conventional technology.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

The following describes a configuration of a pressure sensor as first and second embodiments of the present invention with reference to the accompanying drawings. In the following description, terms such as "upper," "lower," "left," and "right" are used merely for indicating directions in the drawings and do not apply any limitation on the configuration or position of the pressure sensor according to the present invention.

Configuration of Pump Apparatus

Figure 1:
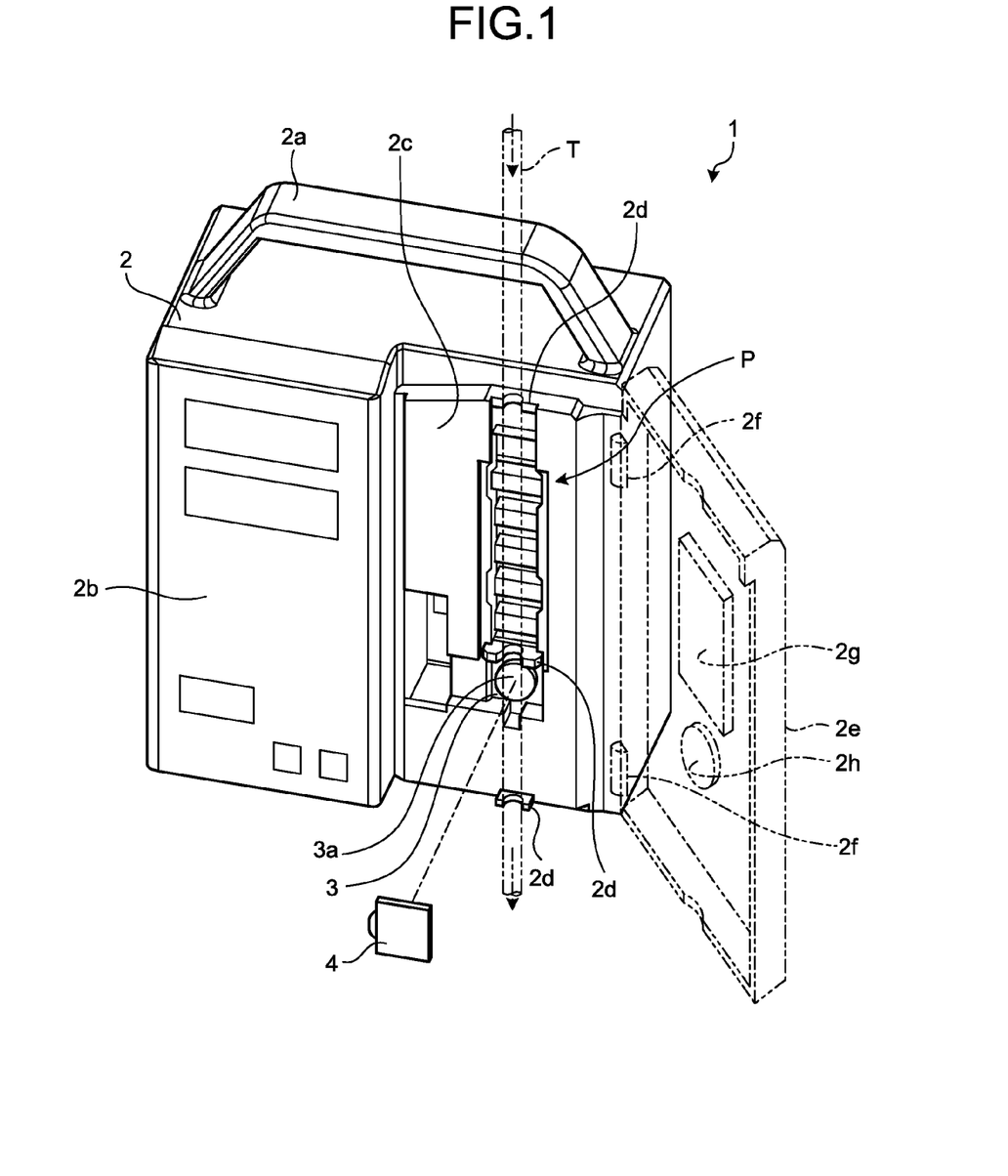
FIG. 1 is a perspective view of a configuration of a pump apparatus in which a pressure sensor as first and second embodiments of the present invention is used.

The following first describes a configuration of a pump apparatus in which the pressure sensor as the first and the second embodiments of the present invention is used with reference to FIG. 1. However, the field of application of the pressure sensor according to the present invention is not limited to the pump apparatus illustrated in FIG. 1.

FIG. 1 is a perspective view of the configuration of the pump apparatus in which the pressure sensor as the first and the second embodiments of the present invention is used. As illustrated in FIG. 1, this pump apparatus 1 in which the pressure sensor as the first and the second embodiments of the present invention is used is an apparatus that delivers infusion solutions such as chemical solutions and dialysates and includes a housing 2 having a handle 2a on the top face thereof. The housing 2 houses a pump mechanism P, a controller that controls the operation of the pump apparatus 1, and the like.

A control panel face 2b is formed on the left half part on the front of the housing 2. A pump mechanism arrangement face 2c is formed at a position retracted toward the back side on the right half part on the front of the housing 2.

The control panel face 2b is provided with a plurality of switches for operating the pump apparatus 1 such as a power switch, a solution delivery start switch, a solution delivery end switch, a forced stop switch, and a warning sound/warning message stop switch.

The pump mechanism arrangement face 2c is provided with the pump mechanism P and a pressure sensor 3 as the first and the second embodiments of the present invention. The pressure sensor 3 is arranged at a position immediately below the pump mechanism P and on the back side of an elastic body 4. The elastic body 4 is formed of a flat, sheet-shaped or film-shaped elastic body.

Tube guides 2d are provided at a plurality of places (three places in the example illustrated in FIG. 1) in an up-and-down direction of the pump mechanism arrangement face 2c. The tube guides 2d guide and hold an infusion tube T routed in the up-and-down direction through the pump mechanism P and a sensor face 3a of the pressure sensor 3 to and at a fixed place. The sensor face 3a is not necessarily flat.

A door 2e that covers the pump mechanism arrangement face 2c is mounted on the housing 2. The door 2e is mounted on the housing 2 in an openable and closable manner through hinges 2f. A tube retainer plate 2g is mounted on the back of the door 2e. The tube retainer plate 2g is a retainer member that brings the infusion tube T into intimate contact with the pump mechanism P when the door 2e is closed to cause solution delivery operation to be normally performed.

A tube retainer 2h is mounted on the back of the door 2e. The tube retainer 2h includes a tube retainer main body and a coil spring, which are not illustrated. The tube retainer 2h brings the infusion tube T, the elastic body 4, and the sensor face 3a of the pressure sensor 3 into intimate contact with each other when the door 2e is closed as follows.

Specifically, the coil spring biases the tube retainer main body from the door 2e toward the pressure sensor 3, thereby bringing the infusion tube T into intimate contact with the elastic body 4 and bringing the elastic body 4 into intimate contact with the sensor face 3a of the pressure sensor 3 with a certain pressing force. With this intimate contact, the pressure sensor 3 can detect outer diameter deformation along with a change in the internal pressure of the infusion tube T, that is, clogging of the infusion tube T.

Configuration of Pressure Sensor

The following describes the configuration of the pressure sensor as the first and the second embodiments of the present invention with reference to FIG. 2 to FIG. 6.

First Embodiment

Figure 2:
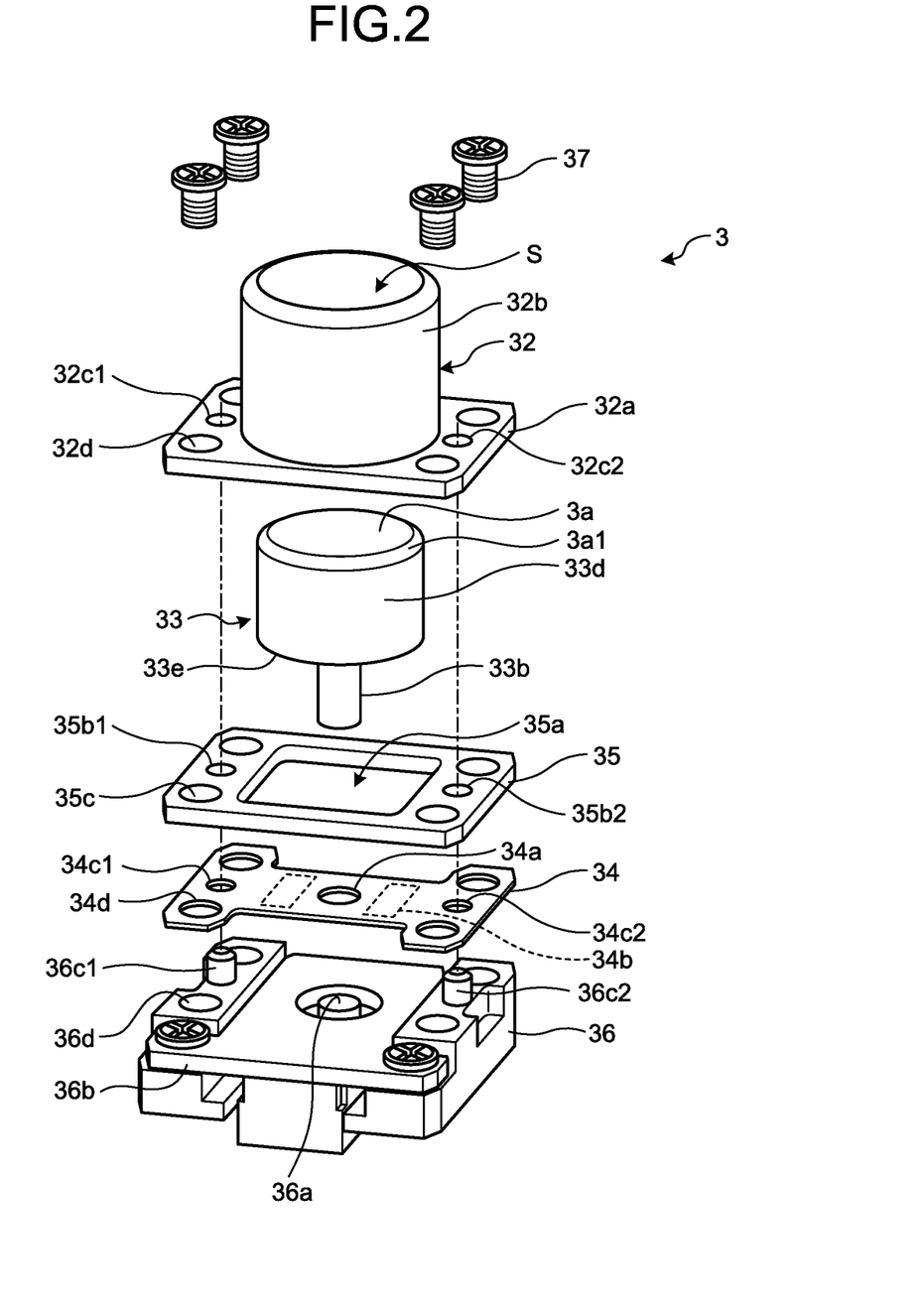
FIG. 2 is an exploded perspective view of a configuration of the pressure sensor as the first embodiment of the present invention.
Figure 3A:
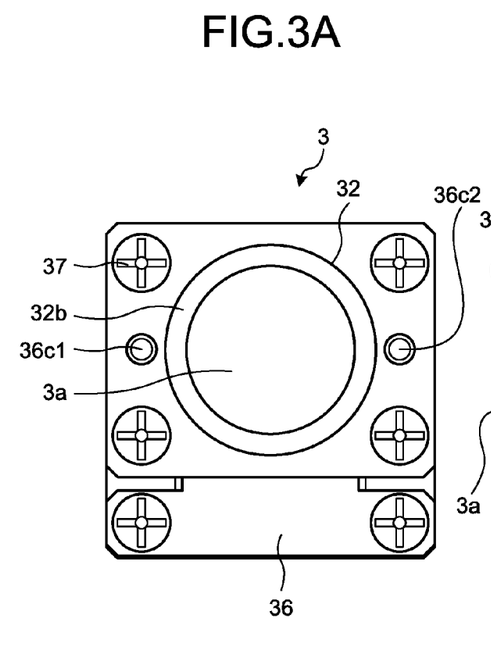
FIGS. 3A and 3B are a plan view and a side view of the configuration of the pressure sensor as the first embodiment of the present invention.
Figure 3B:
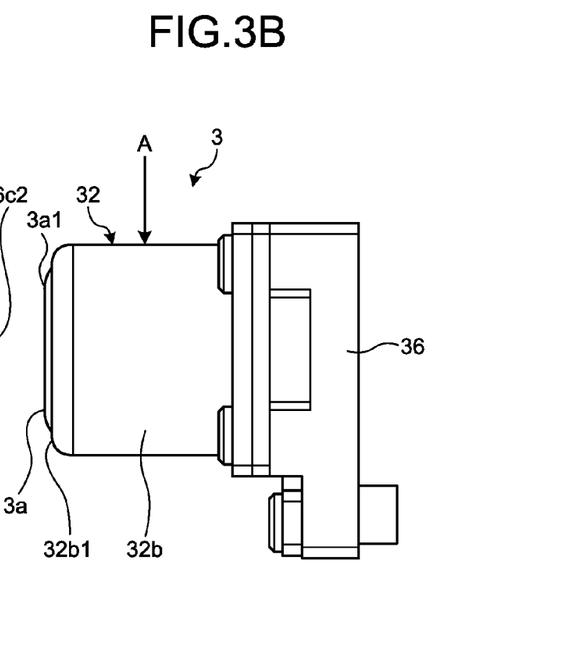

The following first describes the configuration of the pressure sensor as the first embodiment of the present invention with reference to FIG. 2 and FIG. 3. FIG. 2 is an exploded perspective view of a configuration of the pressure sensor 3 as the first embodiment of the present invention. FIGS. 3A and 3B are a plan view and a side view of the configuration of the pressure sensor 3 as the first embodiment of the present invention.

As illustrated in FIG. 2, the pressure sensor 3 as the first embodiment of the present invention includes a cover member 32, a pressing member 33, a flexure element 34, a flexure element retainer 35, and a support member 36.

The cover member 32, which may be configured in a mountable and dismountable manner, includes a plate-shaped base 32a having a through hole (not illustrated) at its central position and a cylindrical protection part 32b erected on the base 32a in such a manner as to surround the through hole of the base 32a. As illustrated in FIGS. 3A and 3B, the protection part 32b covers the peripheral face of the pressing member 33 with the sensor face 3a of the pressing member 33 exposed out of an upper end face 32b1, thereby protecting the pressing member 33 from a lateral force (side pressure) A. The cover member 32 functions as a first cover member according to the present invention.

In the present embodiment, a perimeter 3a1 of the exposed sensor face 3a is chamfered, whereby a face directed from the rim of the sensor face 3a toward the cover member 32 forms an acute angle relative to a face substantially parallel to the sensor face 3a. With this structure, the side pressure is not applied to the sensor face 3a. A clearance is provided between the outer peripheral face of the pressing member 33 and the inner peripheral face of the protection part 32b. The clearance is designed to have a size that can prevent the breakage of the flexure element 34 through contact between the outer peripheral face of the pressing member 33 and the inner peripheral face of the protection part 32b before the flexure element 34 (more specifically, a strain gauge 34b) fixed to the pressing member 33 is broken when the side pressure is applied to the pressing member 33.

Referring back to FIG. 2, the pressing member 33 includes a cylindrical fixing part 33b and a bottomed cylindrical sensor member 33d fixedly supported by the fixing part 33b. The pressing member 33 is mounted on the flexure element 34 by inserting the fixing part 33b into a through hole 34a formed at the central part of the flexure element 34. The pressing member 33 and the flexure element 34 may be fixed to each other by crimping, with a screw, or the like.

A load is applied to the sensor face 3a as the bottom face of the sensor member 33d. When the load is being applied to the sensor face 3a, the sensor member 33d moves in the inside direction of the pressure sensor 3, whereas when no load is being applied to the sensor face 3a, the sensor member 33d returns to its original position through the elastic force of the flexure element 34.

The flexure element 34 is formed of a metallic material such as a stainless steel plate. The through hole 34a into which the fixing part 33b of the pressing member 33 is inserted is formed at the central part of the flexure element 34. The strain gauge 34b is mounted around the through hole 34a. The strain gauge 34b outputs an electric signal corresponding to, when the flexure element 34 becomes deformed owing to the load applied to the pressing member 33 and transmitted to the flexure element 34, the amount of deformation of the flexure element 34.

The flexure element retainer 35 is formed of a metallic material such as a stainless steel plate. An opening 35a into which the pressing member 33 is inserted is formed in the flexure element retainer 35.

The support member 36 is a member that fixedly supports the cover member 32, the pressing member 33, the flexure element 34, and the flexure element retainer 35. A stopper 36a is formed at the central part of the support member 36. There is a clearance between the stopper 36a and the pressing member 33 in a normal state; when the pressing member 33 is pressed, the fixing part 33b of the pressing member 33 comes into contact with the stopper 36a. With this contact, the breakage of the flexure element 34, and thus the strain gauge 34b (extreme bending of the flexure element 34 or the strain gauge 34b, for example) can be prevented.

A substrate 36b is provided on the top face of the support member 36. The substrate 36b mounts thereon circuit elements such as operational amplifiers, resistance elements, and capacitors. The substrate 36b is electrically connected to the strain gauge 34b mounted on the flexure element 34 and outputs the electric signal output from the flexure element 34 to the controller of the pump apparatus 1 illustrated in FIG. 1.

When the pressure sensor 3 having such a configuration is assembled, first, bosses 36c1 and 36c2 protruding on the top face of the support member 36 are inserted into through holes 34c1 and 34c2, respectively, formed in the flexure element 34. Next, the bosses 36c1 and 36c2 of the support member 36 are inserted into through holes 35b1 and 35b2 formed in the flexure element retainer 35. Next, the pressing member 33 is inserted into an internal space S of the cover member 32 and the opening 35a of the flexure element retainer 35, and the fixing part 33b of the pressing member 33 is inserted into the through hole 34a of the flexure element 34. Next, the bosses 36c1 and 36c2 of the support member 36 are inserted into through holes 32c1 and 32c2, respectively, formed in the cover member 32. Finally, screws 37 are inserted into through holes 32d of the cover member 32, through holes 35c of the flexure element retainer 35, and through holes 34d of the flexure element 34 to cause the screws 37 to be screwed with screw holes 36d of the support member 36.

The through hole 34c1 of the flexure element 34, the through hole 35b1 of the flexure element retainer 35, and the through hole 32c1 of the cover member 32 are circular-shaped, whereas the through hole 34c2 of the flexure element 34, the through hole 35b2 of the flexure element retainer 35, and the through hole 32c2 of the cover member 32 are oblong hole-shaped. With this structure, positioning is performed by the circular-shaped through holes, whereas dimensional errors can be absorbed by the oblong hole-shaped through holes.

As is clear from the foregoing description, the pressure sensor 3 as the first embodiment of the present invention includes the sensor member 33d including the sensor face 3a to which pressure is imparted, the support member 36 that supports the sensor member 33d, and the cover member 32 that covers the peripheral face of the sensor member 33d while exposing the sensor face 3a out of one end side. With such a configuration, the sensor member 33d can be protected from the lateral force (the side pressure) A, and the sensor member 33d can be prevented from being broken by the application of the side pressure to the sensor member 33d. In addition, the pressure sensor 3 can be easily mounted and dismounted on and from the pump apparatus 1 without breaking the base of the pressure sensor 3.

Second Embodiment

Figure 4:
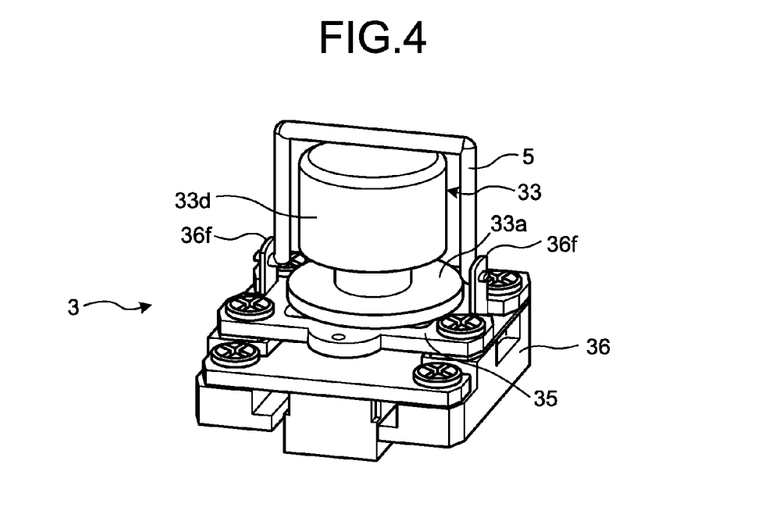
FIG. 4 is a perspective view of a configuration of the pressure sensor as the second embodiment of the present invention.
Figure 5:
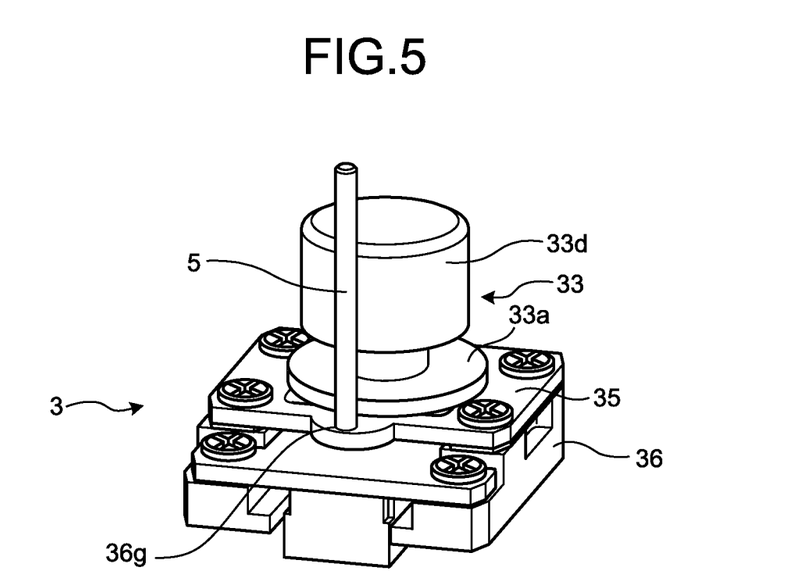
FIG. 5 is a perspective view of a configuration of a first modification of the pressure sensor as the second embodiment of the present invention.
Figure 6:
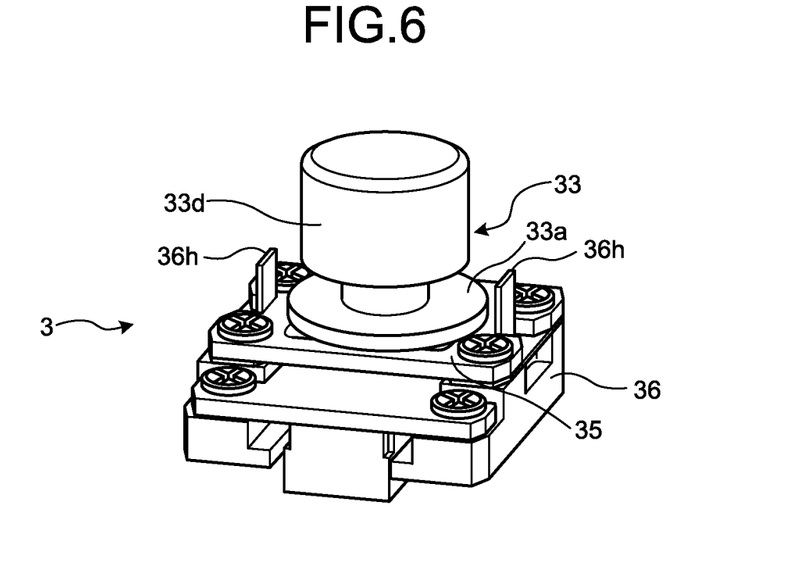
FIG. 6 is a perspective view of a configuration of a second modification of the pressure sensor as the second embodiment of the present invention.

The following describes the configuration of the pressure sensor as the second embodiment of the present invention with reference to FIG. 4 to FIG. 6. FIG. 4 is a perspective view of a configuration of the pressure sensor 3 as the second embodiment of the present invention. FIG. 5 is a perspective view of a configuration of a first modification of the pressure sensor as the second embodiment of the present invention. FIG. 6 is a perspective view of a configuration of a second modification of the pressure sensor as the second embodiment of the present invention.

As illustrated in FIG. 4, the pressure sensor 3 as the second embodiment of the present invention has a configuration that does not include the cover member 32 in the pressure sensor 3 in the first embodiment. In the present embodiment, the pressing member 33 includes a disc-shaped flange 33a, and when the side pressure is applied, the flange 33a comes into contact with the flexure element retainer 35 to function as a stopper in a side pressure direction. In the pressure sensor 3 as the second embodiment of the present invention, jig mounting parts 36f having through holes into which a jig 5 for mounting and dismounting the pressure sensor 3 is inserted is erected on the support member 36. In other words, the support member 36 includes the jig mounting parts 36f on which the jig 5 can be mounted. The jig 5 is for mounting and dismounting the pressure sensor 3 on and from the pump apparatus 1 including the pressure sensor 3. When the pressure sensor 3 in the present embodiment is dismounted from the pump apparatus 1, the jig 5 is mounted on the jig mounting parts 36f, and the pressure sensor 3 is pulled out via the jig 5. With such a configuration, when the pressure sensor 3 is dismounted, a load is applied only to the support member 36 of the pressure sensor 3, whereas no load is applied to the pressing member 33 and the like, and the pressure sensor 3 can be easily mounted and dismounted on and from the pump apparatus 1 without breaking the base of the pressure sensor 3 similarly to the first embodiment. For information, when the cover member 32 is configured to be mountable and dismountable, the cover member 32 is mounted, and the pressure sensor 3 is dismounted by directly holding the cover member 32, whereby the pressure sensor 3 can be dismounted without breaking the base thereof.

As illustrated in FIG. 5, as a first modification, the jig 5 may be mounted on the pressure sensor 3 by forming a jig mounting hole 36g in the support member 36 and inserting the jig 5 into the jig mounting hole 36g. As illustrated in FIG. 6, as a second modification, grips 36h may be erected on the support member 36, and when the pressure sensor 3 in the present embodiment is dismounted from the pump apparatus 1, the pressure sensor 3 may be pulled out by pinching the grips 36h. In both the modifications, when the pressure sensor 3 is dismounted, a load is applied only to the support member 36 of the pressure sensor 3, whereas no load is applied to the pressing member 33 and the like, and the pressure sensor 3 can be easily mounted and dismounted on and from the pump apparatus 1 without breaking the base of the pressure sensor 3 similarly to the first embodiment.

Mounting Structure

Figure 7:
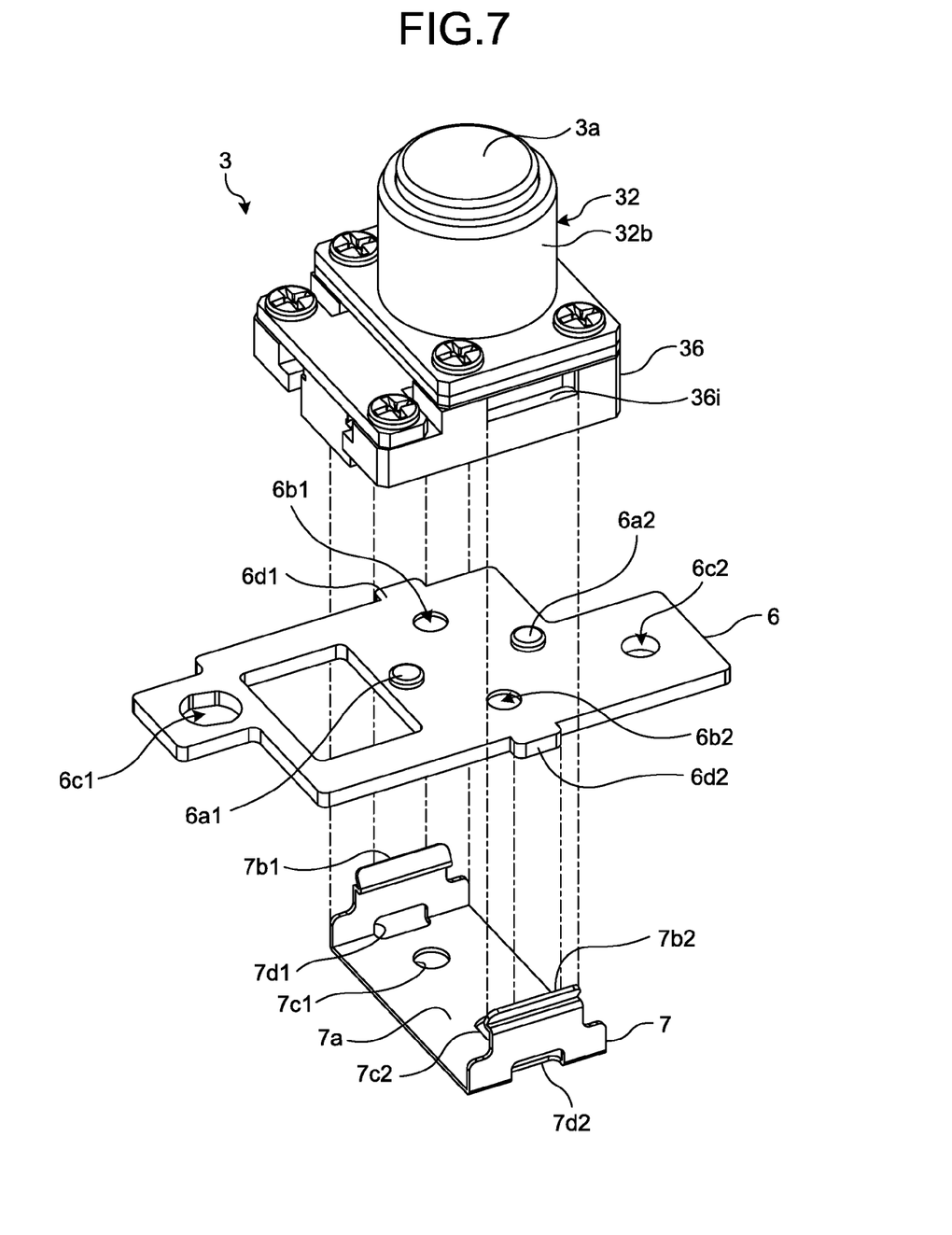
FIG. 7 is an exploded perspective view of a mounting structure of the pressure sensor as the first and the second embodiments of the present invention.

Finally, the following describes a configuration of the pump apparatus 1 on which the pressure sensor 3 as the first and the second embodiments is mounted with reference to FIG. 7. FIG. 7 is an exploded perspective view of a mounting structure of the pressure sensor 3 as the first and the second embodiments of the present invention. Although FIG. 7 illustrates the pressure sensor as the first embodiment of the present invention as the pressure sensor 3, this mounting structure can also be used in the pressure sensor as the second embodiment of the present invention as a matter of course.

As illustrated in FIG. 7, the pump apparatus 1 on which the pressure sensor 3 is mounted is provided with a hold plate 6 and a leaf spring 7.

The hold plate 6 is formed of a plate-shaped metallic member. The hold plate 6 includes bosses 6a1 and 6a2 for positioning the pressure sensor 3, bosses 6b1 and 6b2 for positioning the leaf spring 7, through holes 6c1 and 6c2 for fixing the hold plate 6 to the pump apparatus 1, and protrusions 6d1 and 6d2 to be engaged with the leaf spring 7.

The leaf spring 7 is formed of a metallic member. The leaf spring 7 includes a plate-shaped base 7a and spring parts 7b1 and 7b2 erected on both facing side faces of the base 7a. Positioning holes 7c1 and 7c2 are formed in the base 7a. Openings 7d1 and 7d2 with which the protrusions 6d1 and 6d2 of the hold plate 6 are engaged are formed in boundaries between the base 7a and the spring parts 7b1 and 7b2.

When the pressure sensor 3 is mounted on the pump apparatus 1 by this mounting structure, first, the hold plate 6 is arranged from the back side of the pump apparatus 1, and screws are inserted into the through holes 6c1 and 6c2 to be screwed with screw holes of the pump apparatus 1, thereby fixing the hold plate 6 to the pump apparatus 1. Next, the positioning holes 7c1 and 7c2 of the leaf spring 7 are fit into the bosses 6b1 and 6b2 of the hold plate 6 to engage the protrusions 6d1 and 6d2 of the hold plate 6 and the openings 7d1 and 7d2 of the leaf spring 7 with each other, thereby fixing the leaf spring 7 to the hold plate 6. Finally, the pressure sensor 3 is arranged at an arrangement position from the front side of the pump apparatus 1, a connector of the pump apparatus 1 and the pressure sensor 3 are connected to each other, and the spring parts 7b1 and 7b2 are engaged with engagement parts 36i formed in the support member 36 of the pressure sensor 3. Consequently, the pressure sensor 3 can be mounted on the pump apparatus 1. When the pressure sensor 3 is dismounted from the pump apparatus 1 for maintenance work, the protection part 32b of the cover member 32 is held, and the pressure sensor 3 is pulled out with a force larger than the biasing force of the spring parts 7b1 and 7b2, whereby the pressure sensor 3 can be dismounted from the pump apparatus 1. With such a mounting structure, the pressure sensor 3 can be mounted on the pump apparatus 1 with high precision, and clogging of the infusion tube T can be stably detected. Although the pump apparatus 1 supports the pressure sensor 3 in a mountable and dismountable manner using the leaf spring 7 in the present embodiment, the pump apparatus 1 may support the pressure sensor 3 in a mountable and dismountable manner using a support member other than the leaf spring 7.

Figure 8:
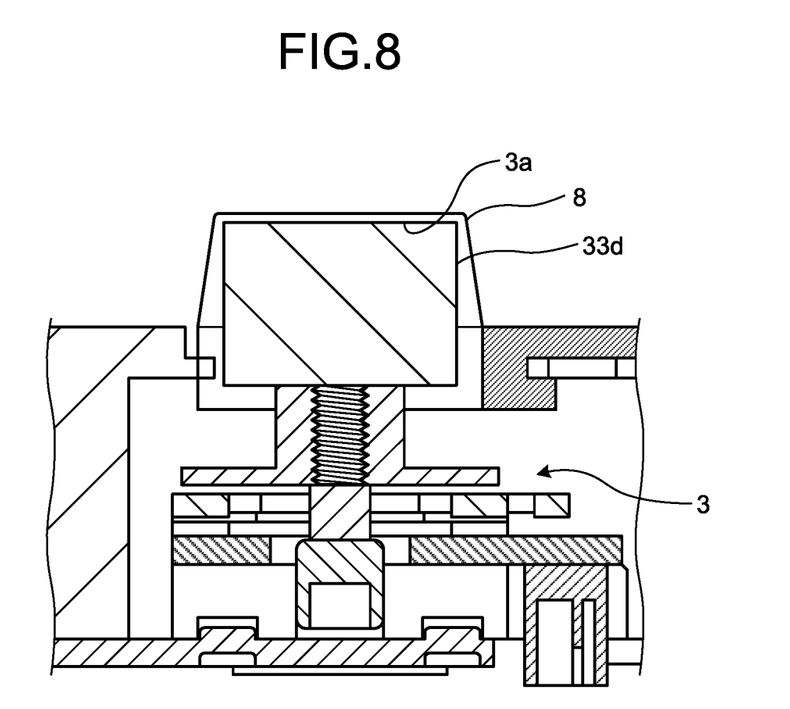
FIG. 8 is sectional view of a configuration of an application example of the pressure sensor as the first and the second embodiments of the present invention.

Although the embodiments to which the invention that has been made by the inventors of the present invention is applied have been described, the present invention is not limited by the description and the drawings that form part of the disclosure of the present invention by the present embodiments. In the first and the second embodiments, a gasket 8 that covers the sensor face 3a may be provided as illustrated in FIG. 8, for example. With such a configuration, contamination such as an infusion solution adhering to the pump apparatus 1 can be prevented from entering the inside of the pressure sensor 3. The gasket 8 functions as a second cover member according to the present invention. Although the sensor face 3a is covered using the gasket 8 in the present embodiments, the sensor face 3a may be covered using a cover member other than the gasket 8. Thus, other embodiments, examples, operating techniques, and the like carried out by those skilled in the art based on the present embodiments are all included in the scope of the present invention.

The pressure sensor and the apparatus according to the present invention can prevent the base of the pressure sensor from being broken by the application of side pressure to the base of the pressure sensor.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A pressure sensor comprising:
   a sensor member including a sensor face to which pressure is imparted; and
   a first cover member that covers at least part of an outer peripheral face of the sensor member while exposing one end side of the sensor face,
   wherein a perimeter of the exposed sensor face is chamfered such that an exposed rim of the sensor face forms an acute angle, and
   a rim of a face on one end side of the first cover member forms an acute angle.

2. An apparatus comprising: the pressure sensor according to claim 1; and
   a support member that supports the pressure sensor in a mountable and dismountable manner.

3. The apparatus according to claim 2, further comprising a second cover member that covers the sensor face of the pressure sensor.

4. An apparatus comprising:
   the pressure sensor according to claim 1; and
   a second cover member that covers the sensor face of the pressure sensor.

5. The pressure sensor according to claim 1, further comprising a support member including a jig mounting part that supports the sensor member and is capable of mounting a jig.

6. The pressure sensor according to claim 5, wherein the jig is for mounting and dismounting the pressure sensor on and from an apparatus comprising the pressure sensor.

7. The pressure sensor according to claim 1, wherein the first cover member is mountable and dismountable.

8. A pressure sensor comprising:
   a sensor member including a sensor face to which pressure is imparted on one end side;
   a fixing part that fixedly supports the sensor member on another end side;
   a flange formed around the fixing part;
   a flexure element retainer provided on an opposite side of the sensor face across the flange; and
   a cover member that covers at least part of an outer peripheral face of the sensor member while exposing one end side of the sensor face,
   wherein a perimeter of the exposed sensor face is chamfered such that an exposed rim of the sensor face forms an acute angle, and
   a rim of a face on one end side of the cover member forms the acute angle.

9. The pressure sensor according to claim 8, wherein the flange is disc-shaped.

* * * * *